United States Patent [19]

Abusleme et al.

[11] Patent Number: 5,516,863

[45] Date of Patent: May 14, 1996

[54] (CO)POLYMERIZATION PROCESS IN AQUEOUS EMULSION OF FLUORINATED OLEFINIC MONOMERS

[75] Inventors: Julio A. Abusleme, Saronno; Patrizia Maccone; Pasqua Colaianna, both of Milan, all of Italy

[73] Assignee: Ausimont S.p.A., Italy

[21] Appl. No.: 516,685

[22] Filed: Aug. 18, 1995

Related U.S. Application Data

[63] Continuation of Ser. No. 210,926, Mar. 21, 1994.

[30] Foreign Application Priority Data

Mar. 23, 1993 [IT] Italy .................... MI93A0551

[51] Int. Cl.$^6$ .................... C08F 2/00; C08F 2/38
[52] U.S. Cl. .................... 526/206; 526/212; 526/255
[58] Field of Search ............................ 526/206

[56] References Cited

U.S. PATENT DOCUMENTS

| | | |
|---|---|---|
| 2,515,628 | 7/1950 | Castle . |
| 2,520,388 | 8/1950 | Earl . |
| 3,467,635 | 9/1969 | Brasen et al. . |
| 3,624,250 | 11/1971 | Carlson . |
| 3,635,926 | 1/1972 | Gresham et al. . |
| 3,865,845 | 2/1975 | Resnick . |
| 3,978,030 | 8/1976 | Resnick . |
| 4,243,770 | 1/1981 | Tatemoto et al. . |
| 4,360,652 | 11/1982 | Dohany .................... 526/210 |
| 4,426,501 | 1/1984 | Khan . |
| 4,513,129 | 4/1985 | Nakagawa et al. . |
| 4,675,380 | 6/1987 | Buckmaster et al. . |
| 4,694,045 | 9/1987 | Moore . |
| 4,789,717 | 12/1988 | Giannetti et al. . |
| 4,864,006 | 9/1989 | Giannetti et al. . |
| 4,973,633 | 11/1990 | Moore . |
| 5,037,914 | 8/1991 | Monti .................... 526/206 |
| 5,087,679 | 2/1992 | Inukai et al. . |

FOREIGN PATENT DOCUMENTS

| | | |
|---|---|---|
| 0027009 | 4/1981 | European Pat. Off. . |
| 0073087A1 | 3/1983 | European Pat. Off. . |
| 0076581A2 | 4/1983 | European Pat. Off. . |
| 0080187A2 | 6/1983 | European Pat. Off. . |
| 0369727 | 5/1990 | European Pat. Off. . |
| 0407937A1 | 1/1991 | European Pat. Off. . |
| 0518073A1 | 12/1992 | European Pat. Off. . |
| 2052495 | 5/1971 | Germany . |
| 4618139 | 5/1971 | Japan .................... 526/206 |
| 62-285907 | 12/1987 | Japan .................... 526/247 |
| 805115 | 11/1958 | United Kingdom .................... 526/206 |
| 888765 | 2/1962 | United Kingdom . |

OTHER PUBLICATIONS

Kirk–Othmer, "Encyclopedia of Chemical Technology", vol. 8, pp. 500–515 (1979).

Primary Examiner—Joseph L. Schofer
Assistant Examiner—N. Sarofin
Attorney, Agent, or Firm—Bryan Cave

[57] ABSTRACT

Radical (co)polymerization process of fluorinated olefinic monomers, optionally in association with one or more non-fluorinated olefins, in which the monomers are (co)polymerized in aqueous emulsion, in the presence of a hydrogenated chain transfer agent selected from hydrogen, aliphatic hydrocarbons and fluorohydrocarbons $C_1$–$C_{20}$ and of a branched chain aliphatic alcohol $C_3$–$C_{12}$ characterized by a ratio between the number of hydroxyl groups and the number of methyl groups lower than or equal to 0.5.

10 Claims, No Drawings

(CO)POLYMERIZATION PROCESS IN AQUEOUS EMULSION OF FLUORINATED OLEFINIC MONOMERS

This is a continuation of U.S. application Ser. No. 08/210,926, filed Mar. 21, 1994.

The present invention relates to a polymerization process in aqueous emulsion of fluorinated olefinic monomers, in which hydrogenated chain transfer agents are used, in association with branched chain aliphatic alcohols.

It is known to utilize hydrogen or hydrocarbons or fluorohydrocarbons having low molecular weight as chain transfer agents in polymerization reactions in aqueous emulsion of fluorinated olefinic monomers, optionally in association with fully hydrogenated olefins. Such transfer agents show the advantage of giving non-polar end groups, more stable than the end groups obtainable with other chain transfer agents (such as methanol).

For instance, in U.S. Pat. No. 3,635,926 a copolymerization process of tetrafluoroethylene with perfluoroalkylvinylethers in aqueous emulsion is described, wherein hydrogen, methane or ethane are used as chain transfer agents. To obtain a sufficient chain transfer effect, it is necessary to employ such transfer agents, which are all above the critical temperature in the usual polymerization conditions, with high partial pressures. Consequently, by acting at the same operating pressure, it is obtained a reduction in the monomer partial pressure, and therefore an increase of the low molecular weight fractions in the final product, with unavoidable worsening of the mechanical properties. To avoid that, the operating pressure could be increased, but this would cause evident plant drawbacks, particularly when tetrafluoroethylene is used, for which it is recommended for safety reasons operating at a pressure as low as possible.

The Applicant has now surprisingly found that it is possible to considerably increase the efficiency of the hydrogenated chain transfer agents by adding to the reaction mixture a branched chain aliphatic alcohol.

It is, therefore, an object of the present invention a radical (co)polymerization process of one or more fluorinated olefinic monomers, optionally in association with one or more non-fluorinated olefins, wherein said monomers are (co)polymerized in aqueous emulsion, in the presence of a hydrogenated chain transfer agent selected from hydrogen, aliphatic hydrocarbons and fluorohydrocarbons having from 1 to 20, preferably from 1 to 8, carbon atoms, and of a branched chain aliphatic alcohol, having from 3 to 14, preferably from 3 to 8, carbon atoms and characterized by a ratio among the number of hydroxyl groups and the number of methyl groups lower than or equal to 0.5.

The presence of the branched chain alcohol, by increasing the effectiveness of the hydrogenated chain transfer agent, allows to employ the latter with lower partial pressures and therefore it reduces the formation of low molecular weight fractions. Moreover, the addition of the branched chain alcohol allows an effective control of the molecular weight without impairing the reaction rate and therefore the process productivity.

Moreover, the experimentation performed by the Applicant demonstrates that the branched chain alcohol by itself exerts an irrelevant activity as chain transfer agent. Therefore, the alcohol acts only as activator with respect to the actual chain transfer agent. This fact is very important for the stability of the final product, since a transfer activity of the alcohol would lead to an undesired introduction of polar moieties as end groups.

Moreover, the addition of the branched chain alcohol makes effective as chain transfer agents also those hydrocarbons which have low activity by themselves. For instance, with the process object of the present invention it is possible to employ as chain transfer agents n-pentane and other hydrocarbons liquid at room temperature, which can be more easily handled and dosed if compared with gaseous hydrocarbons such as methane and ethane.

Examples of hydrogenated chain transfer agents employable in the process object of the present invention are: methane, ethane, propane, n-butane, isobutane, n-pentane, isopentane, cyclopentane, methylcyclopentane, n-hexane, cyclohexane, methylcyclohexane, 1,1-difluoroethane, or mixtures thereof.

Examples of branched chain aliphatic alcohols employable in the process object of the present invention are: isopropanol, terbutanol, pinacol, 2,4-dimethyl-3-pentanol, 2,4,4-trimethyl-1,3-pentandiol, or mixtures thereof.

The amount of hydrogenated chain transfer agent and of aliphatic alcohol to be used can vary within a very wide range and depends on various factors, such as the polymerization conditions (in particular temperature, presence of co-solvents, etc.), the monomer nature, besides, of course, on the structure of the chain transfer agent and of the alcohol. According to the characteristics of the final product to be obtained, the skilled person will be able to choose case by case the most suitable concentrations of chain transfer agent and of alcohol. For indicative purposes the weight ratio between alcohol and transfer agent can vary from 0.005 to 500, preferably from 0.05 to 50.

The (co)polymerization is carried out in aqueous emulsion according to methods well known in the art (see for instance U.S. Pat. Nos. 3,635,926 and 4,426,501). Preferably, the process is carried out in aqueous emulsion in the presence of an emulsion or microemulsion of perfluoropolyoxyalkylenes, according to what described in U.S. Pat. Nos. 4,789,717 and 4,864,006, which are herein incorporated by reference.

As known in the art, the (co)polymerization reaction occurs in the presence of suitable initiators, such as inorganic (for instance, ammonium or alkali metal persulphates) or organic (for instance, disuccinylperoxide, terbutyl-hydroperoxide, diterbutyl-peroxide) peroxides, or also azo-compounds (see U.S. Pat. Nos. 2,515,628 and 2,520,338). It is also possible to employ organic or inorganic redox systems, such as ammonium persulphate/sodium sulphite, hydrogen peroxide/aminoiminomethansulphinic acid. The amount of radical initiator is that commonly employed for the (co)polymerization of fluorinated olefinic monomers, and it is generally comprised between 0,003% and 2% by weight with respect to the total amount of (co)polymerized monomers.

As known, the emulsion technique requires also the presence of surfactants. Among the various kinds of surfactants employable in the process object of the present invention, we would like to cite in particular the products of formula:

where $R_f$ is a (per) fluoroalkyl chain $C_5-C_{16}$ or a (per)fluoropolyoxyalkylene chain, $X^-$ is $-COO^-$ or $-SO_3^-$, $M^+$ is selected from $H^+$, $NH_4^+$, alkali metal ion. The most commonly used are: ammonium perfluoro-octanoate, (per)fluoropolyoxyalkylenes end-capped with one or more carboxylic groups, etc.

The reaction temperature can vary within wide ranges, generally comprised between 10° and 150° C., preferably between 50° and 80° C., while the pressure is generally comprised between 10 and 100 bar, preferably between 15 and 40 bar.

The process object of the present invention can be employed with all kinds of fluorinated olefinic monomers, optionally containing hydrogen and/or chlorine and/or bromine and/or iodine and/or oxygen, provided that they are able to give rise to (co)polymers for reaction with radical initiators in aqueous emulsion. Among them we cite: perfluoroolefins $C_2$–$C_8$, such as tetrafluoroethylene (TFE), hexafluoropropene (HFP), hexafluoroisobutene; hydrogenated fluoroolefins $C_2$–$C_8$, such as vinyl fluoride (VF), vinylidene fluoride (VDF) and trifluoroethylene; chloroand/or bromoand/or iodo-fluoroolefins $C_2$–$C_8$, such as chlorotrifluoroethylene (CTFE) and bromotrifluoroethylene; perfluorovinylethers $CF_2$=CFOX, where X is a perfluoroalkyl $C_1$–$C_6$, for instance trifluoromethyl or pentafluoropropyl, or a perfluoro-oxyalkyl $C_1$–$C_9$ having one or more ethereal groups, for example perfluoro-2-propoxy-propyl; perfluorodioxols.

The fluoroolefins can be also copolymerized with non-fluorinated olefins $C_2$–$C_8$, such as ethylene, propylene, isobutylene.

Among the copolymers to which the process object of the present invention can be applied are comprised in particular:

(a) "modified" polytetrafluoroethylene, containing small amounts, generally comprised between 0.1 to 3% by mols, preferably lower than 0.5% by mols, of one or more comonomers such as, for example: perfluoropropene, perfluoroalkylvinylethers, vinylidene fluoride, hexafluoroisobutene, chlorotrifluoroethylene;

(b) TFE thermoplastic polymers containing from 0.5 to 8% by mols of at least a perfluoroalkyvinylether, where the alkyl has from 1 to 6 carbon atoms, such as, for instance, TFE/perfluoropropylvinylether and TFE/perfluoromethylvinyllether copolymers;

(c) TFE thermoplastic polymers containing from 2 to 20% by mols of a perfluoroolefin $C_3$–$C_8$, such as, for example, FEP (TFE/HFP copolymer), to which other comonomers having vinylether structure can be added in small amounts (lower than 5% by mols) (see for instance U.S. Pat. No. 4,675,380);

(d) TFE or CTFE copolymers with ethylene, propylene or isobutylene, optionally containing a third fluorinated comonomer in amounts comprised between 0.1 and 10% by mols (see for instance U.S. Pat. Nos. 3,624,250 and 4,513,129);

(e) TFE elastomeric copolymers with a perfluoro(oxy)alkylvinylether, optionally containing propylene or ethylene, besides lower amounts of a "cure-site" monomer (see for instance U.S. Pat. Nos. 3,467,635 and 4,694,045);

(f) polymers having dielectric characteristics, comprising 60–79% by mols of VDF, 18–22% by mols of trifluoroethylene and 3–22% by mols of CTFE (see U.S. Pat. No. 5,087,679).

(g) VDF elastomeric polymers, such as VDF/HFP copolymers and VDF/HFP/TFE terpolymers (see, for instance, GB Patent 888,765 and Kirk-Othmer, "Encyclopedia of Chemical Technology", Vol. 8, pag. 500–515—1979); such polymers can also contain: hydrogenated olefins, such as ethylene and propylene (as described for instance in EP-518,073); perfluoroalkylvinylethers; bromine "cure-site" comonomers and/or terminal iodine atoms, according to what described, for instance, in U.S. Pat. Nos. 4,243,770, 4,973,633 and EP-407,937.

(h) polyvinylidenfluoride or "modified" polyvinylidenfluoride containing little amounts, generally comprised between 0.1 and 10% by mols, of one or more fluorinated comonomers, such as hexafluoropropene, tetrafluoroethylene, trifluoroethylene.

The polymers of the above indicated classes, and in particular the TFE polymers, can be modified with perfluorinated dioxols, according to what described for instance in U.S. Pat. Nos. 3,865,845, 3,978,030, EP-73,087, EP76,581, EP-80,187.

Some examples are reported hereinbelow, for merely illustrative and not limitative purposes of the invention itself.

Preparation of the perfluoropolyoxyalkylene microemulsion

In a glass flask equipped with a stirrer, 29.3 g of a compound of formula:

$CF_3O$—$(CF_2$—$CF(CF_3)O)_n(CF_2O)_m$—$CF_2COOH$ having n/m=10 and average molecular weight of 590, were mixed with 16.3 g of $NH_4OH$ at 30% by volume. 32.6 g of demineralized water and 17.6 g of Galden$^{(R)}$ D02 of formula:

having n/m=20 and average molecular weight of 450, were then added. At a temperature of from 60° to 90° C. the mixture was in the form of a microemulsion and appeared as a limpid, thermodynamically stable solution.

EXAMPLE 1

An AISI 316 chromium steel 5 l autoclave, equipped with a stirrer working at 650 rpm, was evacuated and there were introduced in sequence: 3 l of demineralized water; 32.33 g per $H_2O$ liter of perfluoropropylvinylether (PPVE); the microemulsion of perfluoropolyoxyalkylenes previously prepared, in such an amount to obtain 2 g of fluorinated surfactant per $H_2O$ liter; 0.26 g per $H_2O$ liter of isopropanol. The autoclave was then brought to the reaction temperature of 75° C., charged with 1 absolute bar of $CH_4$ and then with TFE to a working pressure of 20 absolute bar. When the working pressure was reached, 300 ml of a 0.00123 molar aqueous solution of potassium persulphate (KPS) were fed. The working pressure was maintained constant during the reaction by feeding TFE.

After 140 minutes the reaction was stopped by cooling the autoclave at room temperature. The emulsion was then discharged and the polymer coagulated by mechanical stirring, separated from the aqueous medium and then washed with $H_2O$ and dried. 40 g of TFE/PPVE copolymer (about 98/2 by mols) have been obtained. The measured values of Melt Flow Index (MFI) and productivity ($R_p$) are reported in Table 1. The productivity is expressed as polymer g/$l_{H2O}$/min.

EXAMPLE 2 (comparative)

The same procedure of Example 1 was followed, with the sole difference that isopropanol was not added. After 140 minutes, 1560 g of TFE/PPVE copolymer were obtained. The data are reported in Table 1.

EXAMPLE 3 (comparative)

Example 2 was repeated, with the sole difference that methane was introduced with a pressure of 6.5 absolute bar. After 140 minutes, 490 g of TFE/PPVE copolymer were obtained. The data are reported in Table 1.

EXAMPLE 4 (comparative)

The same procedure of Example 1 was followed, with the sole difference that methane was not introduced. After 140 minutes, 600 g of TFE/PPVE copolymer were obtained. The data are reported in Table 1.

EXAMPLE 5

Example 1 was repeated following the same procedure, with the sole difference that, instead of isopropanol, pinacol was employed, in an amount of 0.33 g per $H_2O$ liter. After 140 minutes, 560 g of TFE/PPVE copolymer were obtained. The data are reported in Table 1.

EXAMPLE 6 (comparative)

The same procedure of Example 5 was followed, with the sole difference that methane was not introduced. After 140 minutes, 1100 g of TFE/PPVE copolymer have been obtained. The data are reported in Table 1.

EXAMPLE 7

Example 1 was repeated following the same procedure, with the sole difference that, instead of isopropanol, terbutanol was utilized, in an amount of 0.52 g per $H_2O$ liter. After 140 minutes, 400 g of TFE/PPVE copolymer were obtained. The data are reported in Table 1.

EXAMPLE 8 (comparative)

The same procedure of Example 7 was followed, with the sole difference that methane was not introduced. After 140 minutes, 950 g of TFE/PPVE copolymer were obtained. The data are reported in Table 1.

EXAMPLE 9

An AISI 316 chromium steel 5 l autoclave, equipped with a stirrer working at 570 rpm, was evacuated and there were introduced in sequence: 3.4 l of demineralized water; the perfluoropolyoxyalkylene microemulsion previously prepared, in such an amount to obtain 18 g of fluorinated surfactant; 64 g of terbutanol; 3 g of n-pentane. The autoclave was then brought to the reaction temperature of 75° C. and charged with ethylene and TFE in such an amount to obtain, at the working pressure of 22 absolute bar, an ethylene/TFE ratio in the gaseous phase equal to about 20/80 by mols. When the working pressure was reached, 1.5 g of KPS dissolved in 100 ml of water were fed. The working pressure was maintained constant during the reaction by feeding an ethylene/TFE mixture in molar ratio 49/51.

After 151 minutes the reaction was stopped by cooling the autoclave at room temperature. The emulsion was then discharged and the polymer coagulated (by addition of HCl at 37% under mechanical stirring), separated from the aqueous medium and then washed with $H_2O$ and dried. 650 g of ethylene/TFE copolymer (about 48/52 in mols) were obtained. The measured values of Melt Flow Index (MFI) and productivity ($R_p$) are reported in Table 2.

EXAMPLE 10 (comparative)

The same procedure of Example 9 was followed, with the sole difference that terbutanol was not added. After 118 minutes, 650 g of ethylene/TFE copolymer were obtained. The data are reported in Table 2.

EXAMPLE 11 (comparative)

The same procedure of Example 9 was followed, with the sole difference that n-pentane was not added. After 90 minutes, 650 g of ethylene/TFE copolymer were obtained. The data are reported in Table 2.

TABLE 1

| EX. | $CH_4$ (bar) | ALCOHOL ($g/l_{H2O}$) | MFI (g/10') (ASTM D3307-86) | $R_p$ ($g/l_{H2O}$/min) |
|---|---|---|---|---|
| | | isopropanol | | |
| 1 | 1 | 0.26 | >100 | 0.086 |
| 2 | 1 | — | 0.6 | 3.4 |
| 3 | 6.5 | — | 24.2 | 1 |
| 4 | — | 0.26 | s.f. | 1.3 |
| | | pinacol | | |
| 5 | 1 | 0.33 | 3.2 | 1.21 |
| 6 | — | 0.33 | s.f. | 2.7 |
| | | terbutanol | | |
| 7 | 1 | 0.52 | 20 | 0.87 |
| 8 | — | 0.52 | s.f. | 2.06 | s.f. = scarce fluidity: MFI not measurable.

TABLE 2

| EX. | $n-C_5H_{12}$ (g) | ALCO-HOL (g) | MFI (g/10') (ASTM D3159-83) | $R_p$ ($g/l_{H2O}$/min) |
|---|---|---|---|---|
| | | terbutanol | | |
| 9 | 3 | 64 | 56.3 | 1.22 |
| 10 | 3 | — | s.f. | 1.56 |
| 11 | — | 64 | s.f. | 2.05 | s.f. = scarce fluidity: MFI not measurable.

We claim:

1. A radical (co)polymerization process for (co)polymerizing one or more fluorinated olefinic monomers, optionally with one or more non-fluorinated olefins, said process comprising (co)polymerizing said monomers in aqueous emulsion in the presence of a chain transfer system, said chain transfer system consisting of:

(a) a hydrogenated chain transfer agent selected from the group consisting of hydrogen, aliphatic hydrocarbons and fluorohydrocarbons having from 1 to 20 carbon atoms, and (b) an activator for the hydrogenated chain transfer agent, said activator being a branched chain aliphatic alcohol having from 3 to 14 carbon atoms and characterized by a ratio of hydroxyl groups to methyl groups that is lower than or equal to 0.5.

2. The process according to claim 1, wherein said monomers are (co)polymerized in aqueous emulsion in the presence of an emulsion or microemulsion of perfluoropolyoxyalkylenes.

3. The process according to claim 1, wherein the hydrogenated chain transfer agent is an aliphatic hydrocarbon or fluorohydrocarbon having from 1 to 8 carbon atoms.

4. The process according to claim 3, wherein the hydrogenated chain transfer agent is selected from: methane, ethane, propane, n-butane, isobutane, n-pentane, isopentane, cyclopentane, methylcyclopentane, n-hexane, cyclohexane, methylcyclohexane, 1,1-difluoroethane, or mixtures thereof.

5. The process according to claim 1, wherein the branched chain aliphatic alcohol has from 3 to 8 carbon atoms.

6. The process according to claim 5, wherein the branched chain aliphatic alcohol is selected from: isopropanol, terbutanol, pinacol, 2,4-dimethyl-3-pentanol, 2,4,4-trimethyl-1,3-pentandiol, or mixtures thereof.

7. The process according to claim 1, wherein the weight ratio between alcohol and chain transfer agent is comprised between 0.005 and 500.

8. The process according to claim 7, wherein the weight ratio between alcohol and chain transfer agent is comprised between 0.05 and 50.

9. The process according to claim 1, in which the fluorinated olefinic monomers are selected from: perfluoroolefins $C_2$–$C_8$; hydrogenated fluoroolefins $C_2$–$C_8$; chloro- and/or bromo- and/or iodofluoroolefins $C_2$–$C_8$; perfluorovinylethers $CF_2$=CFOX, where X is a perfluoroalkyl $C_1$–$C_6$ or a perfluorooxyalkyl $C_1$–$C_9$ having one or more ethereal groups; perfluorodioxols.

10. The process according to claim 1, wherein the non-fluorinated olefins have from 2 to 8 carbon atoms.

* * * * *